March 28, 1961     E. C. WHITEHEAD ET AL     2,976,761
APPARATUS FOR USE IN ANALYZING FLUIDS
Filed Aug. 30, 1956
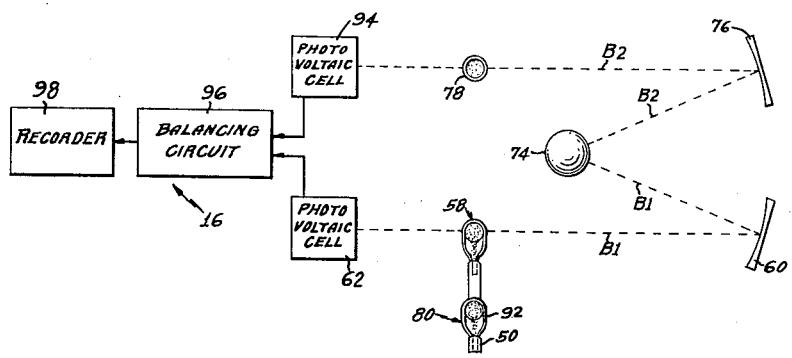
FIG. 2
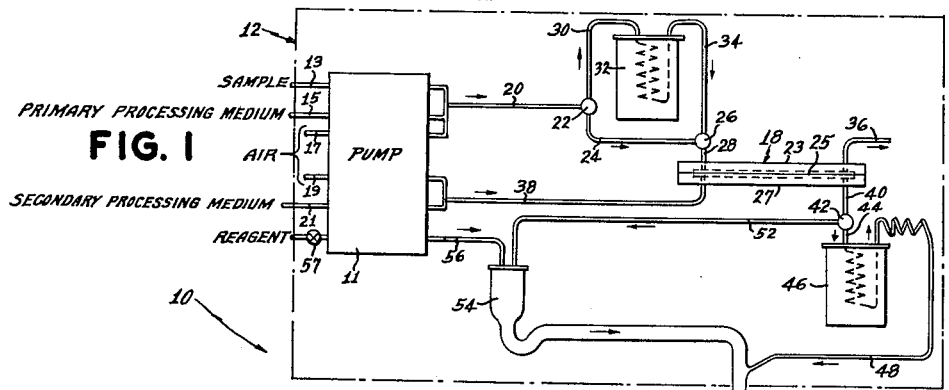
FIG. 1
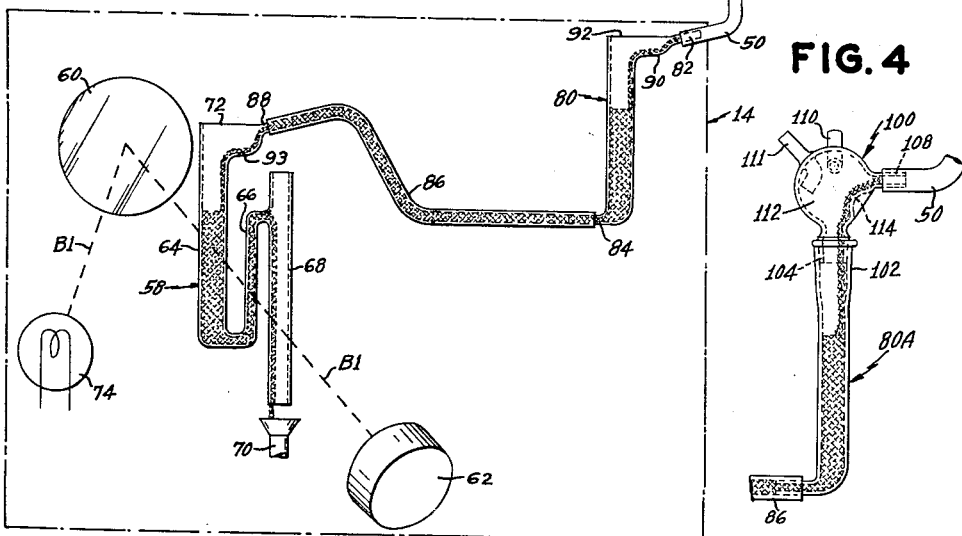
FIG. 4
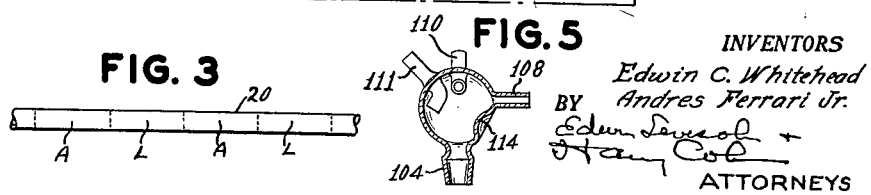
FIG. 3
FIG. 5
INVENTORS
Edwin C. Whitehead
Andres Ferrari Jr.
BY
ATTORNEYS United States Patent Office 2,976,761
Patented Mar. 28, 1961

2,976,761

APPARATUS FOR USE IN ANALYZING FLUIDS

Edwin C. Whitehead, Crestwood, and Andres Ferrari, Jr., Scarsdale, N.Y., assignors, by mesne assignments, to Technicon Instruments Corporation, Chauncey, N.Y., a corporation of New York Filed Aug. 30, 1956, Ser. No. 607,122

7 Claims. (Cl. 88—14)

The present invention relates to apparatus for use in the analysis of body fluids or the like.

Apparatus of the type to which the present invention relates, is described in the copending application of Leonard T. Skeggs, Serial No. 330,211, filed January 8, 1953, assigned to the assignee hereof, now United States Patent No. 2,797,149. As described therein, a sample fluid and one or more processing fluids are formed into a first stream which is conducted to the dialyzate compartment of a dialyzer. The undialyzed stream of liquid may be treated before it arrives at the dialyzer to facilitate the separation of the crystalloid constituents from the colloid constituents of the sample. A receiving solvent constituted by a stream of secondary processing fluid is conducted to the diffusate compartment of the dialyzer, the crystalloids passing through the membrane of the dialyzer into the solvent. Provision is made to introduce air into both streams before they reach the dialyzer so as to break each stream up into a plurality of segments which are separated by air. The diffusate passing from the dialyzer is subjected to treatment to provide a color change in the segments thereof indicative of the concentration of the factor for which the sample is being analyzed. The treated diffusate is directed to a flow cell in which it is subjected to colorimetric examination to provide a quantitative indication of the factor for which the sample is being analyzed, a record being made of the colorimetric examination.

The primary object of the present invention is to provide means which eliminates or substantially reduces undesirable irregularities in the trace formed in the operation of the recorder in the course of the colorimetric analysis of the successive samples.

Another object is to produce, in an apparatus of the described type, a gradual transition or progression of color change, as distinct from a series of individual color changes, so as to produce a colorimetric recording which is smooth and regular in appearance.

Another object of the present invention is to provide means for disrupting air bubbles before the liquid reaches the flow cell.

Another object is to provide means for exhausting gases which may have objectionable odors.

A further object is the provision of means, utilized in combination with the flow cell, to effect a blending of the segments of the diffusate before they pass into the flow cell.

The above and other objects, features and advantages of the present invention will be more fully understood from the following description considered in connection with the accompanying illustrative drawings.

In the drawings which illustrate the best mode presently contemplated of carrying out the invention:

Fig. 1 is a more or less diagrammatic view, in elevation, of an analyzing apparatus, pursuant to the present invention, showing part only of the colorimeter thereof, the recorder being omitted;

Fig. 2 is a combined diagrammatic and schematic illustration of the colorimeter and recorder, the colorimeter being shown in plan view;

Fig. 3 is an enlarged fragmentary view of one of the lines or conduits in the analyzing apparatus;

Fig. 4 is a view, in elevation, illustrating a device which is preferably incorporated in the apparatus illustrated by Fig. 1; and Fig. 5 is a fragmentary view, partly in elevation and partly in section, of the device shown in Fig. 4.

Referring now to the drawings in detail, the automatic analyzing apparatus 10 includes an automatic analyzing means 12 to which body fluid samples, or the like, which are to be analyzed are fed; a colorimeter 14 for effecting a colorimetric examination of the output of the analyzer means 12, and a recording means 16 for recording the colorimetric examination of the output of said analyzer means 12.

The analyzer means 12 includes a dialyzer 18 to which the samples being analyzed and various processing media are fed. More specifically, a pump 11 is utilized to feed a body fluid sample, and one or more primary processing media, depending upon the sample being tested, and air, through the lines, 13, 15 and 17, respectively, into the line 20. For example, and not by way of limitation, the pump may be of the type illustrated in U.S. Patent No. 968,599 to F. I. Du Pont, dated August 30, 1910. As shown therein, a plurality of moving rollers compress a flexible tube, at spaced points therealong, to advance the material to be pumped, therethrough. It will be understood that in the present instance, the rollers would operate on all of the flexible tubes 13, 15, 17, 19, 21 and 56. An improved pump of the type, suitable for use herein, is illustrated and described in the copending application of Andres Ferrari and Jack Isreeli, Serial No. 463,860, filed October 22, 1954, and now Patent No. 2,865,303, and assigned to the assignee herein. Still another type of pump suitable for this purpose is illustrated and described in the previously identified Skeggs application. As in said Skeggs application, the pump 11 herein operates to break up the liquids, which constitute the sample and the various processing media into segments of liquid which are separated by air. As best shown in Fig. 3, the pump 11 will provide in the line 20, segments of liquid L, which segments comprise a mixture of the sample and the primary processing fluid and which are separated by air, as indicated at A. Similarly, it will be understood that the pump will provide in the line 38 segments of the secondary processing fluid which are separated by air.

A two-way valve, designated at 22 permits the undialyzed liquid to be directed to the dialyzate compartment 23 of the dialyzer 18 by either of one or two alternate routes. One of these for use for example where a body fluid sample is being analyzed for glucose, is through line 24, through the two-way valve 26, and thence through the line 28 leading to the dialyzate compartment; the other, for use for example where the analysis is for urea, is through line 30, through a coil in a low temperature bath 32, and thence through line 34, through the valve 26 and line 28 to the dialyzate compartment. In the dialyzer, the crystalloid constituents and the colloid constituents of the sample are separated the crystalloids passing through the dialyzer membrane 25 into the diffusate compartment 27. Whatever the nature of the processing medium and sample, which depends on the nature of the diagnostically significant factor in the sample for which the analysis is being made, what remains after the diagnostically significant factor has been removed in the dialyzer 18 is discarded through the line 36.

The pump 11 also feeds into line 38, through the lines 19 and 21, air and secondary processing medium, respectively. As in the previously identified Skeggs application, the pump is operative to break the processing fluid into air separated segments which forms the receiving solvent. The receiving solvent, for the particular sample being analyzed, is fed through the line 38 to the diffusate compartment 27 of the dialyzer from whence it passes by means of the line 40 into a two way valve 42. In the dialyzer, the crystalloid constituents in the segments of the undialyzed liquid pass into the segments of the receiving solvent. If the analysis is being made for glucose, the resultant diffusate passes through the valve 42 into the line 44. It proceeds thence to the high temperature water bath 46 and the diffusate passes from the analyzer means 12 through the lines 48 and 50.

If however, the analysis that is being made is not for glucose but for urea, the receiving solvent which is fed to the dialyzer compartment 27 by way of line 38, passes, as a diffusate through the line 40, the two-way valve 42 and the line 52 into a reaction tube 54. Simultaneously, the required reagent is admitted, by pump 11, to the reaction tube 54 by way of the line 56, the final mixture passing from the analyzing means 12 by way of the discharge line 50 to which the previously mentioned line 48 is connected. It will be noted that the line 56 is provided with a valve 57 which closes said line when the reagent is not required for a particular analyzing operation.

In operating the apparatus 10, the operator starts samples through the line 13 at suitable intervals. Between successive samples, the operator will ordinarily allow air to be drawn into the system to establish visible inputs for the samples and to prevent them from mixing with each other. The diffusates corresponding to the various samples, issue from the dialyzer in the form of a continuous stream of colored liquid, which is subjected to continuous colorimetric examination in the colorimeter 14 for indicating the color changes therein.

As here shown, the colorimeter 14 includes a flow cell or exposure device 58 which is suitably mounted in position between a reflector 60 and a photo-electric device or photo-voltaic cell 62. The flow cell 58 is provided with an inlet arm 64 and an outlet arm 66, the colored liquid flowing into the inlet arm and through the outlet arm 66 into a discharge tube 68 from which the liquid flows into a waste line 70. The inlet arm 64 is open at the upper end 72 thereof to vent the stream of fluid, and is positioned in the path of the light beam B1 directed from the light source 74 at the reflector 60, and reflected by the latter through the exposure arm 64 to the photo-voltaic cell 62. The colorimeter 14 also includes a second reflector 76 which is adjusted or disposed for reflecting a light beam B2, from the source 74, through a suitable standard 78 at the photo-electric device 94.

Pursuant to the present invention, the segments of the colored liquid in line 50 representative of each sample, are not fed directly to the exposure device 58. As shown in Fig. 1, a mixing tube or blending means 80 is interposed between the outlet tube 50 of the analyzing means 12 and the exposure device 58. The tube 80 has an inlet nipple 82 which is inserted within the line 50, and an outlet spout 84 which is inserted within one end of a conduit 86, the other end of which is engaged with the inlet nipple 88 of the flow cell 58. The nipple 82 is disposed laterally of the main body of the mixing tube 80, being connected thereto by the lateral tube portion 90. The tube is open at the upper end 92 thereof venting to the atmosphere the air bubbles contained within the mixture flowing from the line 50. The tube portion 90 is inclined toward the body of tube 80 so as to prevent the colored segments from falling directly into the column of liquid within the tube 80.

The mixing tube 80 extends upwardly of the flow cell 58 and is disposed relative to the latter so as to permit for the accumulation within the mixing tube 80 of a constant-volume body of liquid therein to a height of approximately one-half the height or longitudinal extent of the mixing tube. For example, and not by way of limitation, in the apparatus as now constructed, 6 cubic centimeters of sample are supplied to the analyzing means 12 in a two minute cycle, 3 cubic centimeters of sample being supplied each minute, and the tube 80 and conduit 86 are vertically related to provide a total constant-volume of fluid in the mixing tube of one-half of a cubic centimeter. With 6 cubic centimeters of sample being supplied to the analyzing means 12, in two minute cycles, and with the constant liquid volume within the tube 80 being one-half of a cubic centimeter, it will be apparent that the fluid within the tube 80, at any instant, will represent 8% of the total sample volume which is supplied for each two minute cycle or 4% of the amount supplied each minute.

The mixture or blending of the segments of liquid or diffusate flowing from line 50 in the mixing tube 80 causes a gradual and uniform color transition in the constant-volume body of liquid therein to provide an even progressive color change from minimum to maximum, and back to minimum again, as the segments representative of each sample flow into the blending tube. This provides for a uniform flow of the mixture to the exposure device or viewing cell 58, and, since the mixture within the tube 80 is undergoing a gradual color change from minimum to maximum color concentration and back again to minimum color concentration rather than an irregular series of color changes, it will be readily apparent that the same gradual and progressive color change is occuring in the liquid which is flowing through the flow cell 58. In addition, the gradual flow of the mixture into the tube 80 through the gradually inclined portion 90 of the latter from whence the liquid flows down the side of the tube, rather than dropping directly into the column of liquid within the tube 80, prevents initial impulses of fluid being added to the column in the tube 80 from being transmitted to the column in the flow cell 58. In this connection, it will also be noted that the liquid flowing into the arm 64 of the flow cell enters gradually along the lateral inclined portion 93 of the latter, which extends from the inlet 88 of the latter in the same manner that the liquid enters the mixture 80. Consequently, the blending of the many segments of fluid in the constant-volume body of fluid within the blender 80, produces a uniform change of color which is transmitted to the constant volume body of fluid within the arm 64 of the flow cell 58, which is subjected to the passage of the light beam B1. The conduit 86 is formed of flexible material to adjust the vertical disposition of the blender 80 relative to the exposure device 58, whereby to vary the height of the liquid column within the blender and the resultant rate of flow of the liquid to the exposure device 58. In this connection it will be understood that the position of the exposure device in the colorimeter 14 is fixed. However, by raising or lowering the vertical position of the blender 80 relative thereto, the height of the liquid column therein can be changed whereby the rate of flow of the liquid from the blender to the flow cell can be regulated as desired. It will be understood that suitable means (not illustrated) are provided to hold each of the blender and the flow cell.

The recording apparatus 16 is of conventional construction, and includes a standard current ratio measuring and balancing circuit 96, to which the outputs of the photo-voltaic cells 62 and 94 are fed. The balancing circuit 96 includes a standard null-type measuring circuit which compares the outputs of the photo-voltaic or barrier layer photo cells 62 and 94. As is well known to those skilled in the art, the output of the balancing circuit 96 is constituted by a signal which is proportionate to the amount of unbalance between the inputs to the balancing circuit from the photo-devices 62 and 94. The unbalance current is used to operate the recorder 98, which is of conventional construction, to provide a record of the color changes in the liquid flowing through the flow cell 58. Since the balancnig circuit 96 and the recorder 98 are of conventional construction and do not, per se, constitute part of the present invention, further description and illustration thereof is deemed to be unnecessary.

Where the output of the conduit 50 is fed directly to the flow cell 58, the segments of fluid discharged from the analyzing means 12, and representative of the segments of each sample introduced thereto, have color concentrations which differ from the preceding and the following segments, and this will tend to result in a relative irregular recording trace or marking by the recorder 98. The irregularities in the resultant record or graph tend to produce undesired interferences in said record which makes it relatively hard to read and reproduce. Through the interposition of the mixing tube or blender 80 between the discharge conduit 50 of the analyzing means 12 and the input to the flow cell 58, the various segments of fluid mixture corresponding to each sample, are blended with each other as one segment follows the next into the constant-volume body or column of liquid within the tube 80. This results in a regular or gradual change in color concentration which is passed on to the flow cell 58. Consequently, the graph or recording produced by the recorder 98 will be free of the previously described interfering irregularities to produce a relatively smooth curve, graph or recording resulting from the gradual change in color. Such a smooth record, free from interfering irregularities, greatly improves the legibility and understanding as well as the reproducibility of the record as well as the comparison of the changing values of the test samples in relation to the standard.

In accordance with a presnetly prefered embodiment of the invention, provision is made for disrupting, i.e., bursting, air bubbles in the fluid stream passing to the blender 80 and for exhausting any gases of objectionable odor which might be present to an exhaust hood or other suitable disposal device. More particularly, as illustrated in Fig. 4 the tube 50, instead of being connected directly to the blender, as shown in Fig. 1, is connected to the fluid treating chamber 100, which is connected to the blender. The latter, indicated at 80A, is provided with a tapered internally ground upper end inlet portion 102 in which a correspondingly tapered externally ground outlet portion 104 of chamber 102 is seated, forming a conventional fluid-tight joint, members 80A and 100 being preferably formed of glass. Member 100 has integral tubular portions 108, 110 and 111 in fixed relation thereto the body portion 112. As shown, tube 50 is connected to tubular inlet 108. The body part 112 of chamber 100 is provided with an internally projecting part 114 in position immediately under inlet 108 so that as the fluid stream enters chamber 100 projection 114 is in the path of said stream and serves to break up any air bubbles entering the chamber 100 as part of said stream. Either or both of the tubular portions 110, 111 may act as vents for the air carried from the disrupted bubbles into the chamber 100 by tube 50. However, it is contemplated that one of said openings 110 or 112 be connected to a suction device so that if any objectionable odors appear, for example, if liberated from the fluid passing into said chamber 100, they may be exhausted to an appropriate point of disposal by connecting a tube between the latter and said tubular portions 110, 112.

This application is a continuation-in-part of our application Serial No. 573,539, filed in the United States Patent Office March 23, 1956, and now abandoned.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent is:

1. In apparatus for effecting the colorimetric examination of a flowing stream of fluid constituted by successive segments of fluid comprising alternate liquid and gaseous fluid segments and wherein the successive liquid segments may differ in color concentration, a device for exposing said stream for colorimetric examination, means to blend said liquid segments prior to the exposure thereof in said device, whereby to obviate irregular color transitions in said exposure device including means operable to eliminate air bubbles from said stream before the latter enters said device, said blending means comprising a chamber having an inlet for said fluid and a outlet connected to said blending means, and means adjacent the inlet of said chamber and extending transversely of the path of flow of the fluid from said inlet to said outlet for disrupting air bubbles which may be present in the fluid as it flows through the inlet of said chamber.

2. In apparatus for effecting the colorimetric examination of a flowing stream of fluid constituted by successive segments of gaseous and liquid fluid and wherein the successive liquid segments may differ in color concentration, a device for exposing the liquid only of said stream for colorimetric examination, means to blend said liquid segments prior to the exposure thereof in said device, whereby to obviate irregular color transitions in said exposure device including means operable to eliminate air bubbles from said stream before the latter enters said device, said blending means comprising a chamber having an inlet for said fluid and an outlet connected to said blending means, and means in said chamber extending transversely of the path of flow of the fluid from said inlet to said outlet for disrupting air bubbles which may be present in the fluid, said chamber also having a vent for the air of the disrupter air bubbles.

3. In analysis apparatus which includes a colorimetric recorder for providing a record of a property of the liquid during the flow of the latter in the form of a continuous stream of successive segments of liquid separated from each other by intervening segments of air, a vertical flow cell to which the liquid flows and in which the liquid is exposed for colorimetric control of the recorder, said flow cell having an inlet and an outlet and an intervening vertical section through which the liquid passes for exposure control of the recorder, and a vertical liquid-receiving chamber disposed laterally of said flow cell and having an upper inlet and a lower liquid outlet in communication with said inlet of the flow cell, means adjacent said chamber inlet for removing said air segments from the liquid segments, said chamber providing means for progressively uniting a plurality of said liquid segments with each other during the flow of said stream to said flow cell whereby to continuously blend the successive liquid segments with each other for the exposure thereof in said flow cell.

4. In apparatus for effecting the colorimetric examination of a flowing stream of fluid constituted by successive segments of fluid comprising alternate liquid and gaseous fluid segments and wherein the successive liquid segments may differ in color concentration, a device for exposing said stream for colorimetric examination, said device comprising a vertical member having an upper inlet, and an exposure portion below said inlet, a vertical part in fluid communication with the said vertical member below said exposure portion and extending vertically to a level above said exposure portion and having an outlet at a level above said exposure portion whereby to provide in said vertical member a vertical column of liquid for exposure for colorimetric examination, and a vertical chamber to blend said liquid segments and to vent said air segments therefrom, said chamber having an upper inlet to receive said stream of fluid, an outlet below said inlet thereof and having a passage connecting the bottom of said chamber to said inlet of said vertical member, the bottom of said chamber being below the inlet of said vertical member whereby a predetermined level of liquid is provided in said chamber for blending a series of the liquid segments therein before they flow to said vertical member for exposure therein, said chamber having a wall provided with a portion projecting into the path of said stream of fluid as it flows into said chamber for disrupting air bubbles in said stream prior to the blending of said liquid segments in said chamber.

5. In apparatus for effecting the colorimetric examination of a liquid in a flowing stream, comprising a vertical member having an upper inlet, and an exposure portion below said inlet, a vertical part in fluid communication with the said vertical member below said exposure portion and extending vertically upwardly to a level above said exposure portion and having an outlet at a level above said exposure portion whereby to provide in said vertical member a vertical column of liquid for exposure for colorimetric examination, and a vertical chamber having an upper inlet for said stream of liquid and having a connection at its bottom with said inlet of said vertical member, said connection comprising a generally U-shaped tubular part with the bend of the U disposed below the inlet of said vertical member, said chamber having an upper opening for venting air therefrom, and having a lateral substantially horizontal portion adjacent its said inlet below said vent opening over which the stream of liquid flows before flowing downwardly into said chamber, said substantially horizontal portion of said chamber being provided with means projecting into the path of said stream of fluid as it flows into said chamber for disrupting air bubbles in said stream prior to the blending of said liquid segments in said chamber.

6. In apparatus for effecting the colorimetric examination of a flowing stream of fluid constituted by successive segments of fluid comprising alternate liquid and gaseous fluid segments and wherein the successive liquid segments may differ in color concentration, a device for exposing said stream for colorimetric examination, said device comprising a vertical member having an upper inlet, and an exposure portion below said inlet, a vertical part in fluid communication with the said vertical member below said exposure portion and extending vertically upwardly to a level above said exposure portion and having an outlet at a level above said exposure portion whereby to provide in said vertical member a vertical column of liquid for exposure for colorimetric examination, and a vertical chamber to blend said liquid segments and to vent said air segments therefrom, said chamber having an upper inlet to receive said stream of fluid, an outlet below said inlet thereof and having a passage connecting the bottom of said chamber to said inlet of said vertical member, the bottom of said chamber being below the inlet of said vertical member whereby a predetermined level of liquid is provided in said chamber for blending a series of the liquid segments therein before they flow to said vertical member for exposure therein, said chamber having a substantially horizontal portion adjacent said inlet of said chamber, and said means for disrupting air bubbles comprising a projection on said horizontal portion in the path of flow of the fluid which is admitted into said chamber through said inlet thereof.

7. In analysis apparatus which includes a colorimetric recorder for providing a record of a property of the liquid during the flow of the latter in the form of a continuous stream of successive segments of liquid separated from each other by intervening segments of air, a vertical flow cell to which the liquid flows and in which the liquid is exposed for colorimetric control of the recorder, said flow cell having an inlet and an outlet and an intervening vertical section through which the liquid passes for exposure control of the recorder, a vertical part in fluid communication with said vertical section at said outlet thereof and extending vertically to a level above said vertical section and having an outlet at a level above said vertical section to provide in said vertical section a vertical column of liquid for exposure for colorimetric examination, and a vertical liquid-receiving chamber disposed laterally of said flow cell and having an upper inlet and a lower liquid outlet in communication with said inlet of the flow cell, means adjacent said chamber inlet for removing said air segments from the liquid segments, said chamber providing means for progressively uniting a plurality of said liquid segments with each other during the flow of said stream to said flow cell whereby to continuously blend the successive liquid segments with each other for the exposure thereof in said flow call.

References Cited in the file of this patent
UNITED STATES PATENTS

| | | |
|---|---|---|
| 854,635 | Duerst | May 21, 1907 |
| 1,426,076 | Hickman | Aug. 15, 1922 |
| 1,900,893 | Hickman | Mar. 7, 1933 |
| 2,019,871 | Pettingill et al. | Nov. 5, 1935 |
| 2,430,895 | Tuve et al. | Nov. 18, 1947 |
| 2,431,899 | Wolf et al. | Dec. 2, 1947 |
| 2,797,149 | Skeggs | June 25, 1957 |

FOREIGN PATENTS

| | | |
|---|---|---|
| 57,338 | Switzerland | Mar. 11, 1911 |
| 837,918 | France | Nov. 28, 1938 |